(12) United States Patent
Yamashita

(10) Patent No.: US 9,400,413 B2
(45) Date of Patent: Jul. 26, 2016

(54) LIGHTING DEVICE

(71) Applicant: CANON KABUSHIKI KAISHA, Tokyo (JP)

(72) Inventor: Kenichiro Yamashita, Nagareyama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 84 days.

(21) Appl. No.: 14/444,292

(22) Filed: Jul. 28, 2014

(65) Prior Publication Data

US 2015/0036360 A1 Feb. 5, 2015

(30) Foreign Application Priority Data

Jul. 30, 2013 (JP) ................................. 2013-157563

(51) Int. Cl.
| | | |
|---|---|---|
| *G03B 15/03* | (2006.01) | |
| *F21V 15/01* | (2006.01) | |
| *F21V 29/00* | (2015.01) | |
| *F21V 29/83* | (2015.01) | |
| *F21V 29/507* | (2015.01) | |

(52) U.S. Cl.
CPC .............. *G03B 15/03* (2013.01); *F21V 15/011* (2013.01); *F21V 29/507* (2015.01); *F21V 29/83* (2015.01); *G03B 2215/0517* (2013.01); *G03B 2215/0521* (2013.01); *G03B 2215/0535* (2013.01); *G03B 2215/0567* (2013.01)

(58) Field of Classification Search
CPC ...... G03B 15/03; G03B 15/041; G03B 15/05; G03B 2215/0521; G03B 2215/0535; G03B 2215/0517; G03B 2215/0567; G03B 2215/0571; F21V 15/01; F21V 29/60; F21V 29/507; F21V 29/83; F21V 14/02; F21V 14/025
See application file for complete search history.

(56) References Cited

U.S. PATENT DOCUMENTS

| | | | | | |
|---|---|---|---|---|---|
| 4,078,240 | A * | 3/1978 | Kaneko | ................... | G03B 15/05 315/241 P |
| 5,194,885 | A * | 3/1993 | Spencer | ................. | G03B 15/05 396/182 |
| 6,969,180 | B2 * | 11/2005 | Waters | ...................... | F21V 9/10 362/293 |
| 7,881,606 | B2 * | 2/2011 | Huang | ................... | G03B 15/03 396/155 |
| 8,435,157 | B2 * | 5/2013 | Matsui | ................... | G03B 15/03 475/343 |
| 8,596,836 | B2 * | 12/2013 | Pedersen | ................. | F21V 21/30 362/249.02 |
| 8,736,710 | B2 * | 5/2014 | Spielberg | ............... | G03B 15/05 348/222.1 |
| 2008/0291677 | A1* | 11/2008 | Chen | ...................... | F21V 29/004 362/249.01 |
| 2012/0320608 | A1* | 12/2012 | Ramirez | ............. | F21V 19/0035 362/373 |

FOREIGN PATENT DOCUMENTS

JP 2010-145764 A 7/2010

* cited by examiner

*Primary Examiner* — Alan Cariaso
(74) *Attorney, Agent, or Firm* — Rossi, Kimms & McDowell LLP

(57) ABSTRACT

An lighting device capable of efficiently dissipating heat generated by a light emitting section without exposing a heat dissipating section to the appearance so as to prevent a user from directly touching the heat dissipating section. A strobe device includes a high-luminance LED, a head plate to which heat generated by the high-luminance LED is transferred, a control unit housing that contains the high-luminance LED and the head plate, a front cover that is used for at least part of an exterior of the control unit housing and is formed with heat dissipating holes, and a bounce housing that can turn with respect to the control unit housing. The heat dissipating holes are formed in a surface, opposed to the bounce housing, of the front cover.

12 Claims, 8 Drawing Sheets

LIGHTING DEVICE

BACKGROUND OF THE INVENTION

1. Field of the Invention

The present invention relates to an lighting device, and more particularly to a heat dissipating structure of an lighting device.

2. Description of the Related Art

In recent digital single-lens reflex cameras, one equipped with a moving image-photographing function has become the standard, and there is an increasing need for equipping not only a conventional lighting device which emits flash light using a xenon tube (hereinafter referred to as the "strobe device"), but also an auxiliary light which is capable of continuously lighting for nighttime photographing. To meet this need, in actuality, a strobe device equipped with an auxiliary light using high-luminance LEDs (hereinafter referred to as the "LED light") has started to be supplied to the markets, but in a case where a high-luminance high-light-level LED light is mounted on a camera, it is an important issue how to treat heat generated by LEDs during light emission. To solve this problem, there has been proposed, for example, a method of finally discharging heat generated by the LEDs to a casing of a camera body using a frame and the like of a strobe device (see Japanese Patent Laid-Open Publication No. 2010-145764).

However, in the case of a single externally-attached strobe device, the casing is small compared with the camera body, and hence it is difficult to form a frame capable of ensuring a sufficient heat capacity. Further, it is desirable to arrange a heat dissipating section in a manner hidden from the appearance so as not to degrade the appearance quality (design) of the strobe device, and what is more, it is desirable from a viewpoint of ensuring user's safety to configure the strobe device such that a user cannot directly touch the heat dissipating section.

SUMMARY OF THE INVENTION

The present invention provides a technique that makes it possible to efficiently dissipate heat generated by a light emitting section without exposing a heat dissipating member to the appearance so as to prevent a user from directly touching the heat dissipating member.

The present invention provides an lighting device comprising a light emission unit, a heat dissipating member to which heat generated by the light emission unit is transferred, a first housing that contains the light emission unit and the heat dissipating member, a first cover that is used for at least part of an exterior of the first housing, the first cover having at least one first opening formed therein, and a second housing that can turn with respect to the first housing, wherein the at least one first opening is formed in a surface, opposed to the second housing, of the first cover.

According to the present invention, it is possible to efficiently dissipate heat generated by the light emitting section, and since the heat dissipating member is not exposed to the appearance, the appearance quality is prevented from being degraded. Further, since a user is prevented from directly touching the heat dissipating member, it is possible to prevent a user from suffering from burn injury or the like accident.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1A:
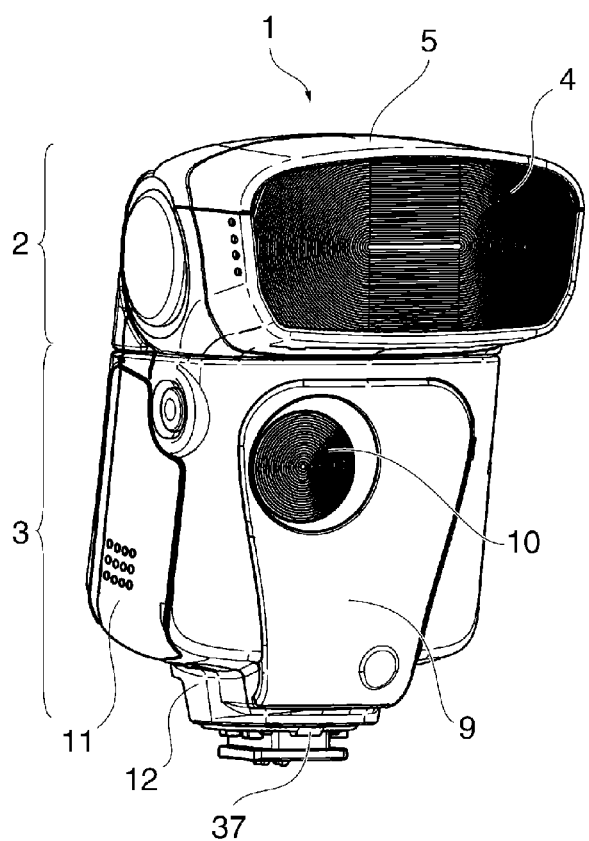
FIGS. 1A and 1B are perspective views of the appearance of a strobe device according to a first embodiment of the present invention.
Figure 1B:
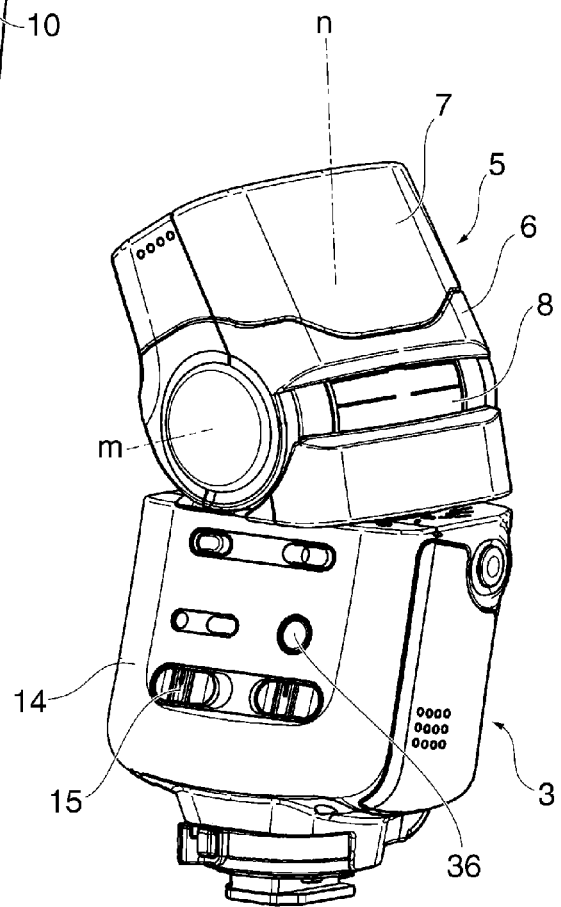

FIGS. 1A and 1B are perspective views of the appearance of a strobe device 1 as an lighting device according to a first embodiment of the present invention, in which FIG. 1A is a view of the strobe device 1, as viewed from the front on which a light emission panel 4 is disposed, and FIG. 1B is a view of the same, as viewed from the rear.

The strobe device 1 basically comprises a head part 2 which is an upper part, and a control unit housing 3 which is a lower part. The head part 2 contains a xenon tube 27 (see FIG. 7) inside the light emission panel 4, which is a main light source during flash light emission photographing for generating flash light, and has a bounce function of changing a direction of emission of flash light from the light emission panel 4 by a turn-around operation. FIG. 1A shows a normal position state of the strobe device 1 in which bounce is not performed, and FIG. 1B shows a bounce state of the strobe device 1 in which bounce is performed through a predetermined angle.

The head part 2 comprises a light emission unit housing 5 and a bounce housing 8 having a cylindrical shape. The light emission unit housing 5 can turn about an m-axis (about a first axis) with respect to the bounce housing 8, which makes it possible to adjust the emission direction in respect of the vertical direction, as viewed in FIGS. 1A and 1B. Further, the bounce housing 8 can turn about an n-axis (about a second axis) orthogonal to the m-axis with respect to the control unit housing 3, which makes it possible to adjust the emission direction in respect of the horizontal direction, as viewed in FIGS. 1A and 1B. That is, the light emission unit housing 5 can turn with respect to the control unit housing 3 in the vertical direction and in the horizontal direction, as viewed in FIGS. 1A and 1B.

The control unit housing 3, as described hereinafter, accommodates various printed circuit boards for control, which are control means of the strobe device 1, and includes an operation panel, a power source, and so forth. In the present embodiment, the casing of the strobe device 1 is formed by the three housings of the light emission unit housing 5 and the bounce housing 8, which are divided for the sake of the bounce function, and the control unit housing 3.

Figure 7:
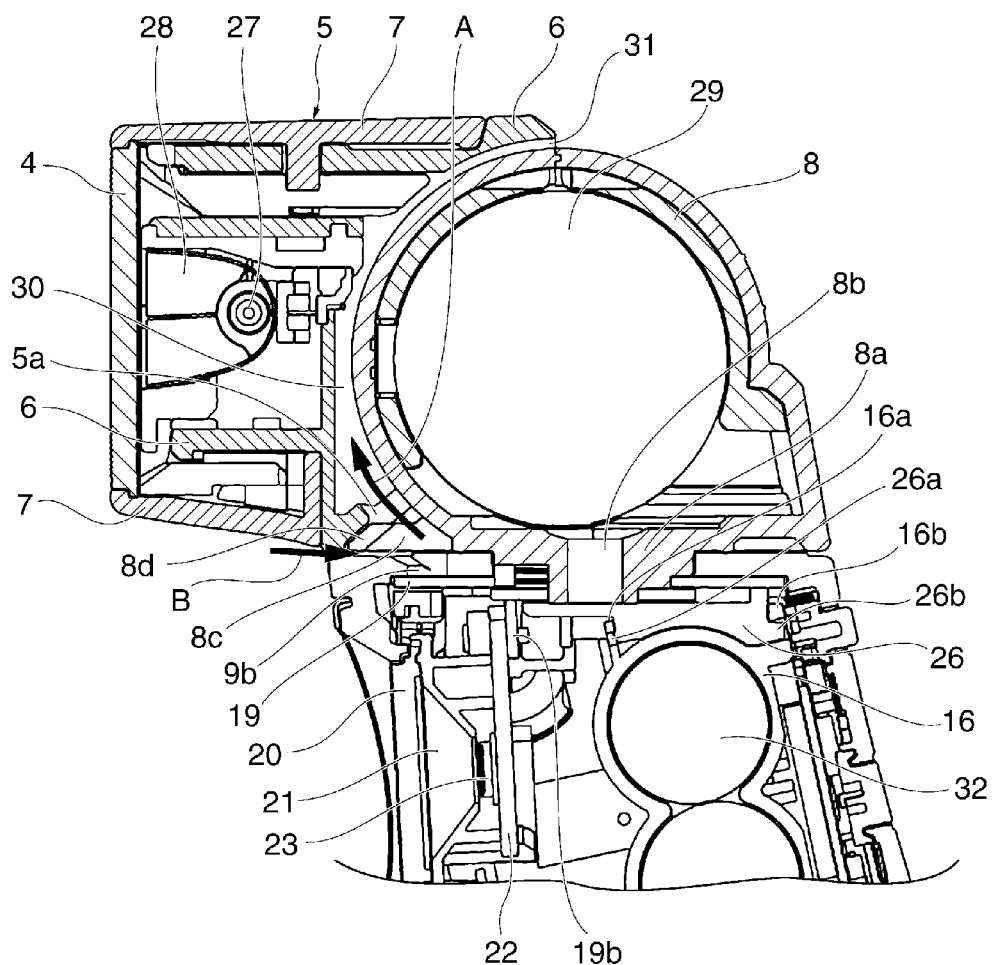
FIG. 7 is a longitudinal sectional view of the strobe device shown in FIGS. 1A and 1B.

The light emission unit housing 5 comprises a first light emission housing 6 attached to the bounce housing 8, and a second light emission housing 7 including the light emission panel 4. The reason for this arrangement will be described with reference to FIG. 7. FIG. 7 is a longitudinal sectional view of the strobe device 1, showing a cross-section of the upper part of the control unit housing 3 and the whole head part 2.

The xenon tube 27 for emitting flash light and a reflector 28 containing the xenon tube 27 are disposed in the first light emission housing 6, and a main capacitor 29 for accumulating electric charges for causing the xenon tube 27 to emit flash light is disposed inside the bounce housing 8. Further, the light emission panel 4 formed with a Fresnel lens having light collecting properties is attached to the second light emission housing 7.

The strobe device 1 is equipped with a focus variable mechanism which varies an angle of emitting flash light by relatively moving the second light emission housing 7 relative to the first light emission housing 6. More specifically, when the second light emission housing 7 is manually pulled out of the first light emission housing 6, the light emission panel 4 is separated from the reflector 28, and the flash emitting angle is narrowed by the light collecting action of the light emission panel 4 to thereby make it possible to increase a guide number.

Note that this focus variable mechanism is not directly related to the essential part of the present invention, and hence detailed description thereof is omitted. Hereafter, the first light emission housing 6 and the second light emission housing 7 will be referred to as the light emission unit housing 5 which is an integral unit, unless otherwise specified. Further, other component elements denoted by reference numerals in FIG. 7 will be referred to hereinafter in descriptions given with reference to other figures, as required.

Referring again to FIGS. 1A and 1B, the control unit housing 3 includes a front cover 9 which is a front side exterior member, and a back cover 14 which is a rear side exterior member. The front cover 9 is used for at least part of the exterior of the control unit housing 3. An LED light unit 10 is disposed in a circular opening formed in the upper part of the front cover 9. The back cover 14 is formed as an operation panel, and has various switches, such as a power switch 15, arranged thereon.

The LED light unit 10 is an auxiliary light source used as a light source in flash light emission photographing, separately from the xenon tube 27 which is the main light source in flash light emission photographing, and uses a white high-luminance LED as a light source. The LED light unit 10 is mainly used as a light source e.g. in a case where an object luminance is low during moving image photographing using a moving image-photographing function by a digital single-lens reflex camera (image pickup apparatus), not shown, on which the strobe device 1 is mounted. The LED light unit 10 is configured such that lighting can be switched on or off by depressing a lighting button 36 provided on the back cover 14.

The control unit housing 3 includes a battery cover 11 which can be opened and closed for loading batteries 32 (see FIG. 7) in the control unit housing 3, and a bottom cover 12 which is an exterior member on a lower surface side, and the bottom cover 12 is provided with a leg part 37 which is a mounting portion for mounting the strobe device 1 to a digital single-lens reflex camera, not shown.

Figure 2:
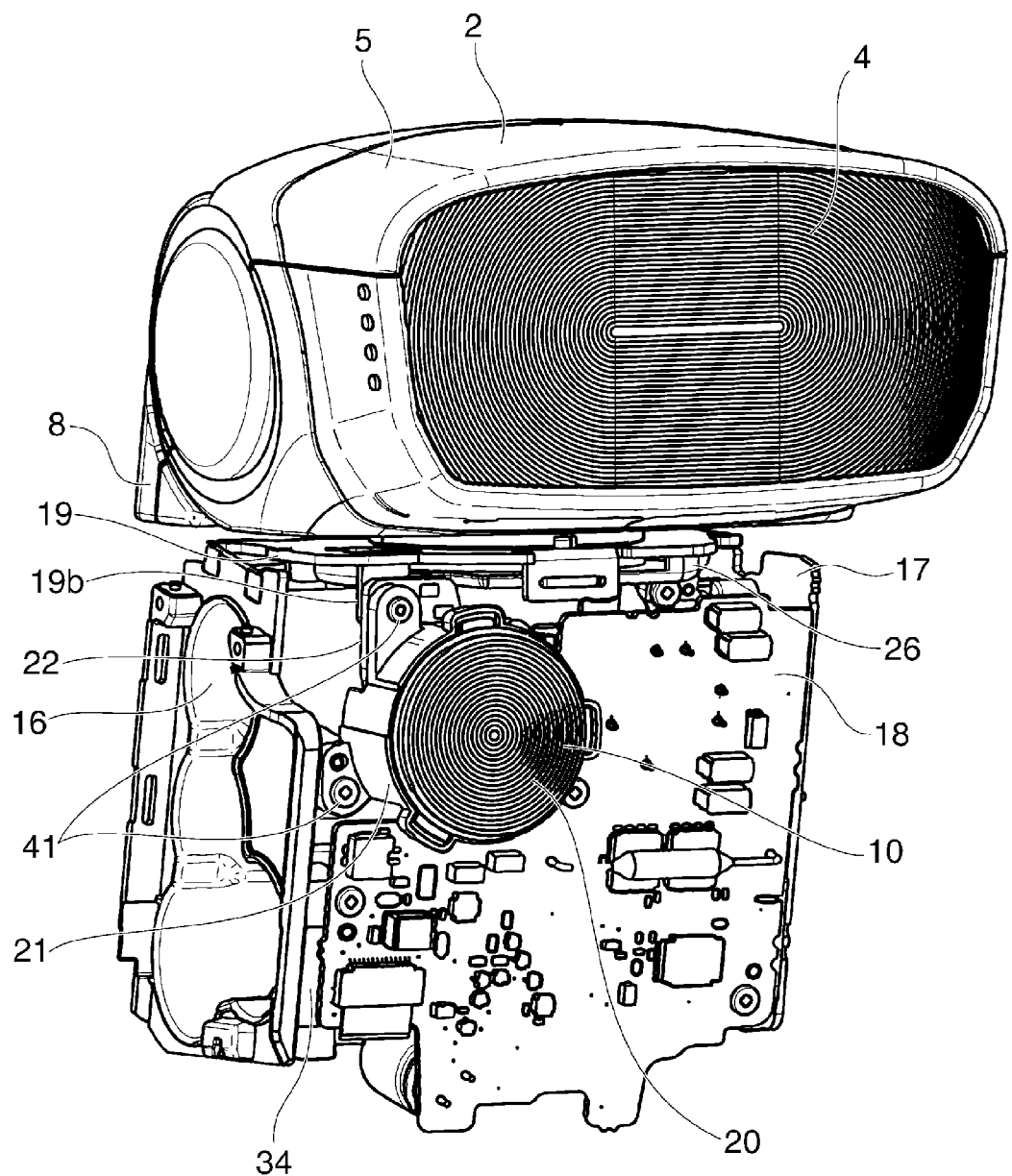
FIG. 2 is a perspective view showing a state of the strobe device in which exterior members are removed from a control unit housing included in the strobe device shown in FIGS. 1A and 1B.

FIG. 2 is a perspective view showing a state of the strobe device 1 in which the exterior members are removed from the control unit housing 3. The control unit housing 3 includes a battery case 16 for accommodating the four AA batteries 32 (see FIG. 7) as a power supply. The battery case is also used as a structure member for temporarily fixing a first sub board 17, a second sub board 18, the LED light unit 10, the head part 2, and so forth.

The first sub board 17 and the second sub board 18 are attached to a side and the front of the battery case 16, respectively. The first sub board 17 and the second sub board 18 each include a power supply system circuit, a boosting circuit, etc. Further, a main substrate (not shown) for control, on which various switch elements, a MPU, etc. are mounted in association with the operation panel of the back cover 14, is fixed to the rear surface of the battery case 16.

The control unit housing 3 includes a head plate 19 as a heat dissipating member, which is disposed directly below the bounce housing 8. The head plate 19 is a component unitized together with the head part 2, as described hereinafter, and forms an internal member of the control unit housing 3 after the head part 2 is attached to a battery case unit 34 (described hereinafter with reference to FIG. 3). The LED light unit 10 is fixed to the battery case 16 and an arm portion 19b of the head plate 19 with screws 41, respectively. Note that the head plate 19 is disposed at a location closer to heat dissipating holes 9b, described hereinafter, than the LED light unit 10. Other component elements denoted by reference numerals in FIG. 2 will be referred to hereinafter in descriptions given with reference to other figures, as required.

Figure 3:
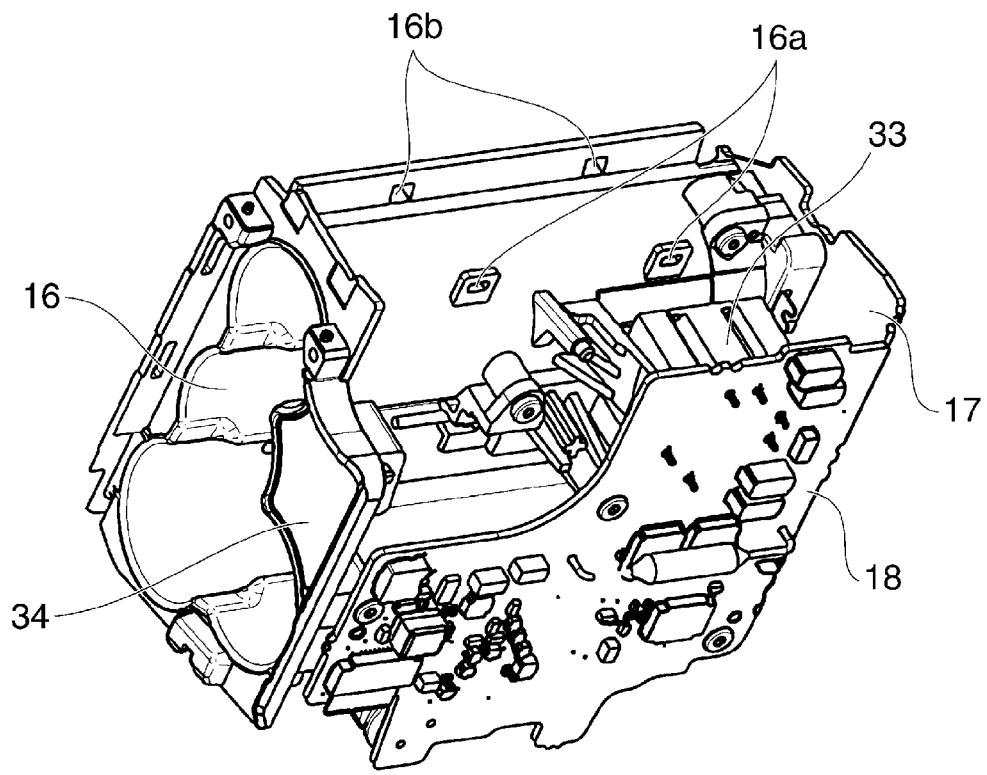
FIG. 3 is a perspective view of a battery case unit included in the control unit housing appearing in FIG. 2.

FIG. 3 is a perspective view of the battery case unit 34 included in the control unit housing 3, showing a state in which the head part 2 and the LED light unit 10 are not mounted. A boosting transformer 33 is mounted on a reverse side of the second sub board 18. Upper part of the battery case 16 is formed with engaging ribs 16a having flexibility and engaging holes 16b, for temporarily fixing the head part 2.

Figure 4:
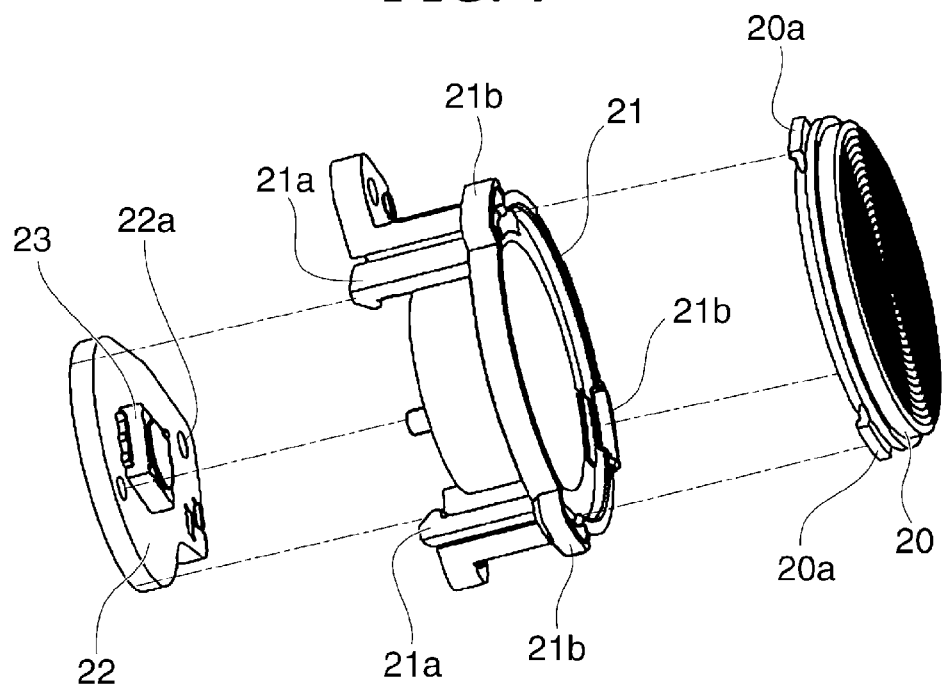
FIG. 4 is an exploded perspective view of an LED light unit included in the control unit housing appearing in FIG. 2.

FIG. 4 is an exploded perspective view of the LED light unit 10. Three engaging portions 20a (one of which is not shown) provided on a Fresnel lens 20 are fixed by adhesive to three bases 21b provided on the front side of a resin holder 21, respectively. On the rear side of the resin holder 21, an LED board 22 having a high-luminance LED 23 mounted thereon is temporarily held by two lug portions 21a provided on the resin holder 21. The LED board 22 is a board made of metal, such as aluminum, so as to increase thermal conductivity. However, the LED board 22 may be made of a material other than metal, or a composite material comprising metal and other materials, insofar as it has a desired thermal conductivity. As mentioned above, the LED light unit 10 is fixed to the battery case 16 and the arm portion 19b of the head plate 19 with the screws 41, respectively, and at this time, the LED board 22 is fastened together with the resin holder 21 by the screws 41 in a state brought into close contact with the arm portion 19b of the head plate (see FIG. 2).

Figure 5:
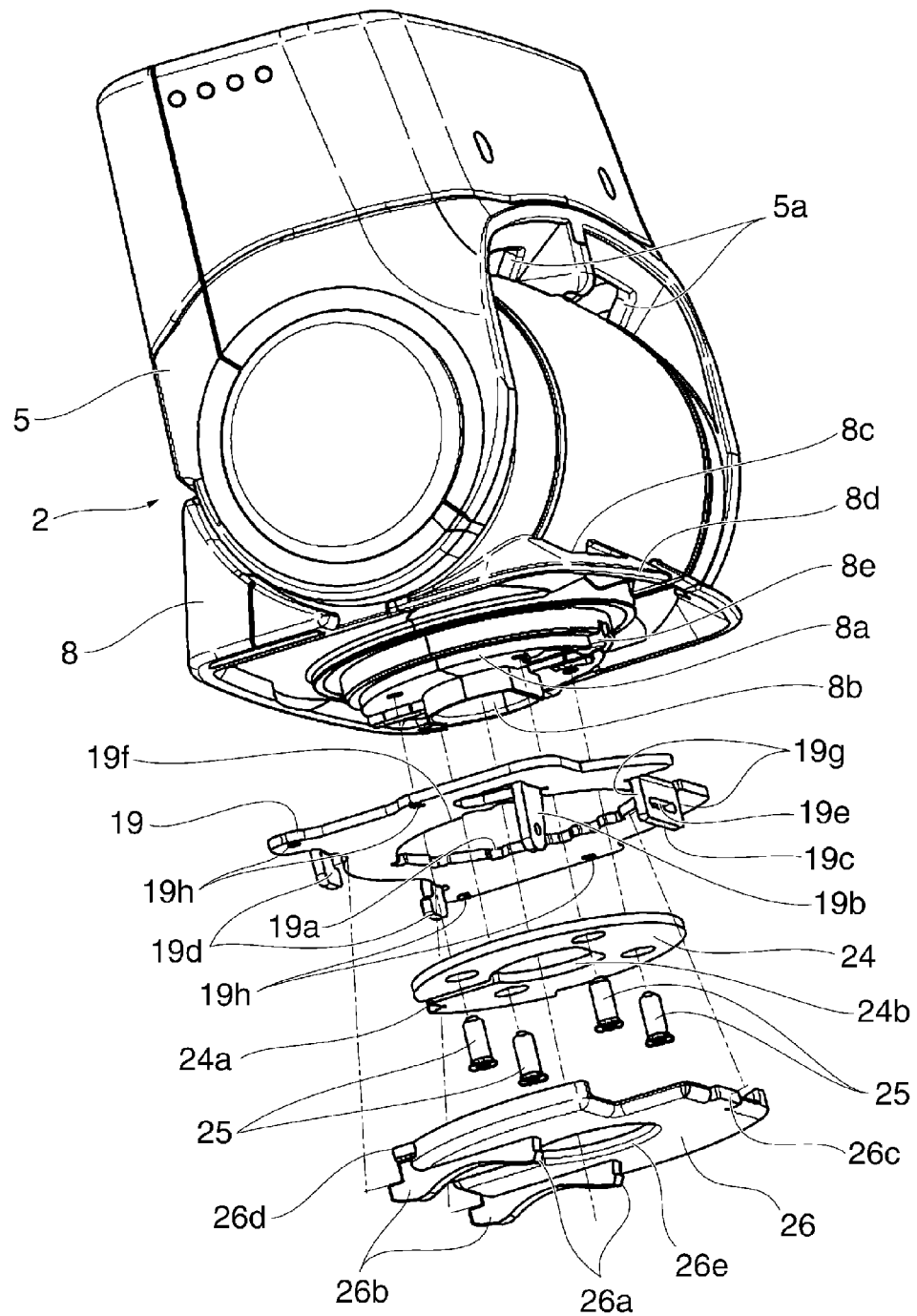
FIG. 5 is an exploded perspective view of a head part included in the strobe device shown in FIGS. 1A and 1B.

FIG. 5 is an exploded perspective view of the head part 2, showing the arrangement of the lower surface side of the bounce housing 8 to which the head plate 19 is attached. A lower surface of the light emission unit housing 5 and a skirt portion 8d of the bounce housing 8 are formed with first vent holes 5a and second vent holes 8c, respectively, and these first vent holes 5a and the second vent holes 8c are used for dissipating heat generated by the high-luminance LED 23, as described hereinafter.

The central portion of a shaft portion 8a provided on the lower surface of the bounce housing 8 is formed with a hole 8b penetrating inside, and a wire harness (not shown) for electrically connecting the components inside the head part 2 and the control unit housing 3 is passed through the hole 8b. The head plate 19 is made of metal, such as aluminum, copper alloy, or stainless steel. A circular hole 19f formed in the central portion of the head plate 19 is substantially fitted on the shaft portion 8a of the bounce housing 8. Further, the head plate 19 is sandwiched between the shaft portion 8a, and a circular rotary plate 24 fixed to a lower surface of the shaft portion 8a of the bounce housing 8 with screws 25, and is disposed in a manner rotatable with respect to the bounce housing 8. Note that a hole 24b formed in the central portion of the rotary plate 24 is fitted on a protruding portion forming the hole 8b.

A rotary plate cover 26 is attached to the head plate 19 assembled to the bounce housing 8 in a manner covering the rotary plate 24. The central portion of the rotary plate cover 26 is formed with a hole 26e through which the wire harness (not shown) is passed. The rotary plate cover 26 has one engaging protrusion 26c formed on a front part thereof, and two engaging protrusions 26d (one of which is not shown) on a rear part thereof. The engaging protrusions 26c and 26d are engaged with a hole 19e formed in a folding portion 19c provided on the front part of the head plate 19 and two hook portions 19d provided on the rear part of the head plate 19, respectively. This engagement accomplishes attachment of the rotary plate cover 26 to the head plate 19.

The head plate 19 plays a plurality of roles of the mechanism. A plurality of click grooves 19a are formed in an inner periphery of the hole 19f of the head plate 19, and a click pin 8e having an urging force in a radially outward direction is arranged on the shaft portion 8a of the bounce housing 8. The click pin 8e is engaged in each of the plurality of click grooves 19a, whereby when the bounce housing 8 is relatively rotated relative to the control unit housing 3, it is possible to engagingly lock the bounce housing 8 at a predetermined angle by a click force of the click pin 8e.

The rotary plate 24 has a stopper 24a formed in the outer periphery thereof in a protruding manner, and the folding portion 19c on the front part of the head plate 19 protrudes on a path of the stopper 24a. Therefore, the rotation of the head part 2 is restricted by opposite end faces 19g of the folding portion 19c, and by restricting the rotation of the head part 2 as above, it is possible to prevent the wire harness (not shown) passed through the hole 8b of the shaft portion 8a of the bounce housing 8 from being excessively twisted.

Note that the click function and the rotation restriction function of the bounce housing 8 with respect to the control unit housing 3 has been conventionally provided on the front cover 9 made of resin or the like, which is an exterior member, but in the present embodiment, these functions are realized by using the head plate 19 made of metal. This makes it possible to improve durability performance and static-pressure strength.

The head plate 19 is formed with screw holes 19h in four places, which serve to fix the exterior members, as described hereinafter. The rotary plate cover 26 prevents the wire harness (not shown) drawn out toward the control unit housing 3 and the rotating rotary plate 24 from interfering with each other. Two lugs 26a provided on the front part of the lower surface of the rotary plate cover 26 engaged with the engaging ribs 16a formed on the upper part of the battery case 16, and two lugs 26b provided on the rear part of the same are engaged with the engaging holes 16b formed in the upper part of the battery case 16. This causes the head part 2 to be temporarily fixed to the battery case unit 34, and the temporary fixing of the head part 2 makes it very easy to perform an operation for connecting the wire harness extending from the head part 2 to the first sub board 17 and the second sub board 18.

Figure 6:
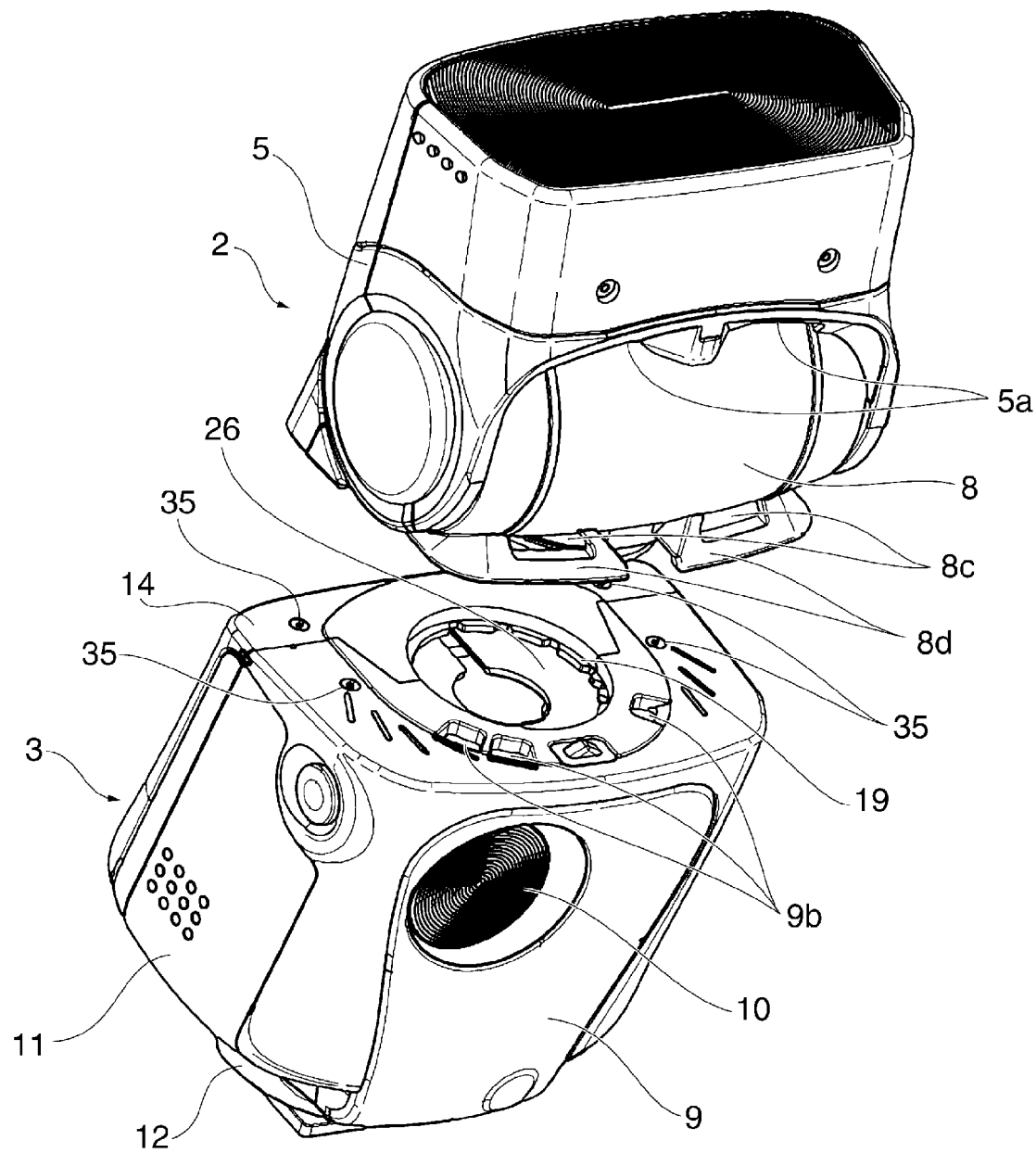
FIG. 6 is an exploded perspective view of the strobe device shown in FIGS. 1A and 1B in a state in which the head part and the control unit housing are separated.

FIG. 6 is an exploded perspective view of the strobe device 1 in a state in which the head part 2 and the control unit housing 3 are separated and the head plate 19 has been mounted on the control unit housing 3. The front cover 9 and the back cover 14 are fixed to the head plate 19 with screws 35 from the upper surface of the control unit housing 3 using the screw holes 19h of the head plate 19. The front cover 9 and the back cover 14 are thus fixed to the head plate 19, whereby the head part 2 is fixed to the control unit housing 3. Although the respective exterior members of the control unit housing 3 including the bottom cover 12 are fixed to the battery case 16 at respective locations using screws, description thereof is omitted.

The three heat dissipating holes 9b are formed in the upper surface of the front cover 9, and the surface of the head plate 19 is exposed within the respective heat dissipating holes 9b. In other words, the heat dissipating holes 9b are formed in a surface of the front cover 9, which is opposed to the bounce housing 8, and the head plate 19 faces at least part of the heat dissipating holes 9b. However, as is clear from the perspective view of the appearance shown in FIGS. 1A and 1B, the heat dissipating holes 9b are located between the head part 2 and the control unit housing 3, and hence are not directly exposed to the outside.

As mentioned above, the lower surface of the light emission unit housing 5 and the skirt portion 8d of the bounce housing 8 are formed with the first vent holes 5a and the second vent holes 8c, respectively. Therefore, when the head part 2 is at the normal position, the heat dissipating holes 9b are in a state communicating with the first vent holes 5a and the second vent holes 8c (see FIG. 7). In other words, when the head part 2 is at the normal position, the heat dissipating holes 9b face at least part of the first vent holes 5a, and the first vent holes 5a face at least part of the second vent holes 8c. Therefore, heat generated by lighting of the high-luminance LED 23 is transferred from the LED board 22 to the whole head plate 19 via the arm portion 19b which is in close contact with the LED board 22 by screw fixing, and further released via the heat dissipating holes 9b to a space at a boundary between the bounce housing 8 and the control unit housing 3. At this time, part of heat transferred to the head plate 19 is also transferred to the front cover 9 which is in close contact therewith, but the heat transferred to the front cover 9 is also transferred therefrom to the space at the boundary between the bounce housing 8 and the control unit housing 3. Note that when the head part 2 is not at the normal position (state shown in FIG. 1B), the heat dissipating holes 9b face none of the first vent holes 5a.

As shown in FIG. 7, air warmed in the space at the boundary between the bounce housing 8 and the control unit housing 3 rises via the first vent hole 5a and the second vent hole 8c through a gap 30 between the light emission unit housing 5 and the bounce housing 8 in a direction indicated by an arrow A, and is finally discharged outside from a gap 31 at the top of the bounce housing 8. When the warmed air flows through this heat dissipating passage, so-called chimney effect is generated, whereby outside air flows into the heat dissipating passage in a direction indicated by an arrow B from the outer periphery of the boundary between the bounce housing 8 and the control unit housing 3, and hence the members defining the passage through which the warmed air flows are prevented from being excessively heated.

As described above, according to the first embodiment, the head plate 19 which functions as a heat dissipating member is arranged on the upper surface of the control unit housing 3 such that it faces the boundary between the control unit housing 3 and the bounce housing 8. This makes it possible to safely realize a structure for dissipating heat generated by the high-luminance LED 23 without adversely affecting the appearance. Further, by using the head plate 19, it is possible to set, to the minimum, the size of the LED board 22 which is relatively costly without limiting the heat dissipating performance to the performance realized by the LED board 22 alone, and hence it is possible to reduce the manufacturing costs of the strobe device 1. Further, the head plate 19 is configured to have the click function, the function of restricting the rotation of the head part 2, and the function of fixing the exterior members, whereby it is also possible to improve mechanical strength of the strobe device 1.

Figure 8:
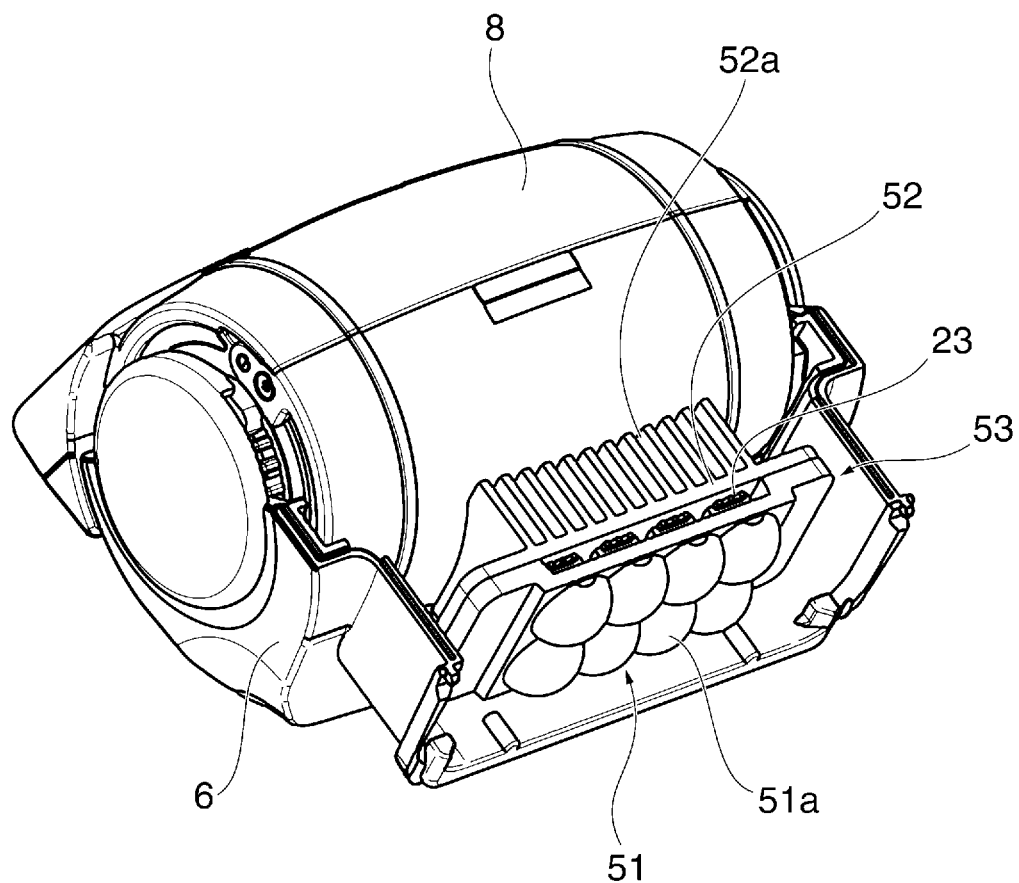
FIG. 8 is a perspective view of the internal structure of a strobe device (structure of a light emitting section housing) according to a second embodiment, including high-luminance LEDs as a main light source.
Figure 9:
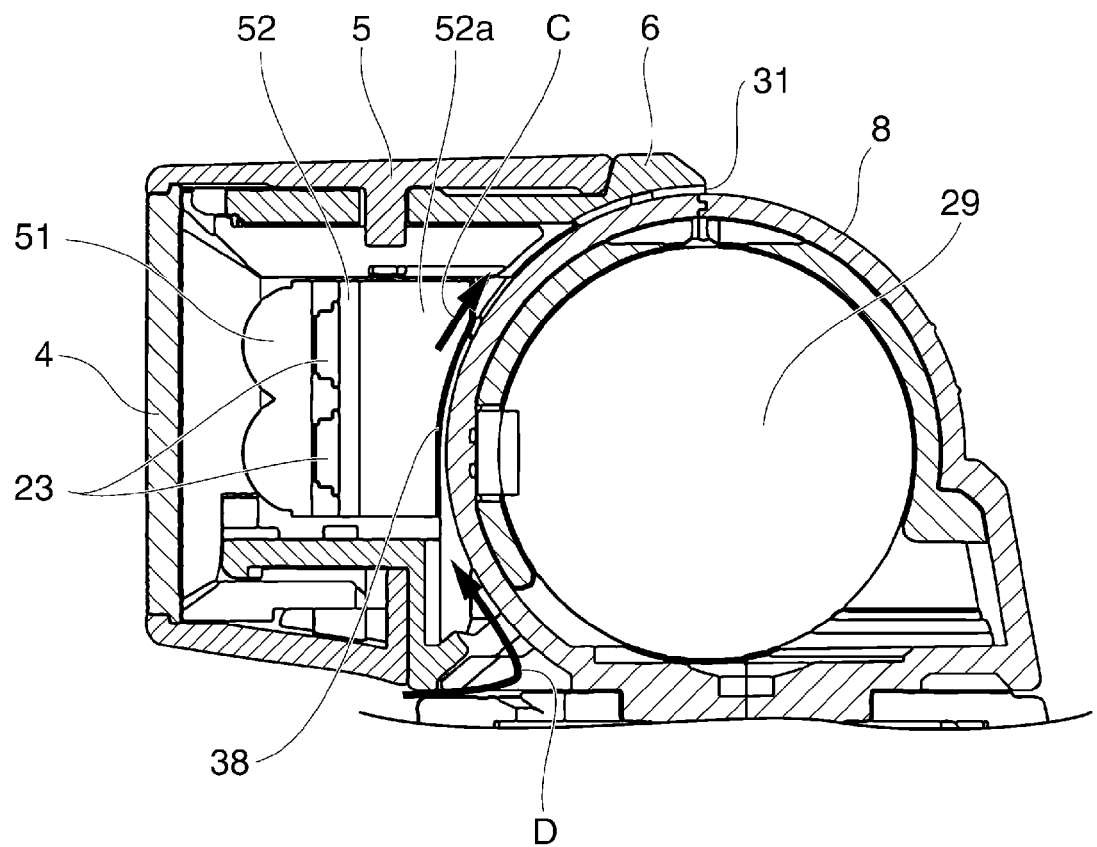
FIG. 9 is a longitudinal sectional view of a head part of the strobe device shown in FIG. 8.

Next, a second embodiment of the present invention will be described. In the second embodiment, a description will be given of a structure in which the xenon tube 27 used in the first embodiment as the main light source is replaced by high-luminance LEDs. FIG. 8 is a perspective view of the internal structure of a strobe device (structure of a light emission unit housing) according to the second embodiment, including the high-luminance LEDs 23 as the main light source. FIG. 9 is a longitudinal sectional view of a head part of the strobe device according to the second embodiment, including the high-luminance LEDs 23 as the main light source. Components of the strobe device according to the second embodiment which are substantially the same as those of the strobe device 1 according to the first embodiment are denoted by the same reference numerals, and duplicate description thereof is omitted.

An amount of light emitted from one high-luminance LED 23 is much smaller, compared with an amount of light emitted from the xenon tube 27, and hence it is necessary to use the plurality of high-luminance LEDs 23 so as to obtain a necessary amount of light. An LED light unit 53 equipped in the strobe device according to the second embodiment includes a LED base 52 made of aluminum, on which the plurality of high-luminance LEDs 23 are mounted, and a lens array 51 in which a plurality of lenses 51a are integrally formed in association with the plurality of high-luminance LEDs 23, respectively. The plurality of lenses 51a serve to efficiently collect light generated by the high-luminance LEDs 23, and emit the collected light toward the light emission panel 4. Further, light emitted from the lens array 51 is properly dispersed by contriving shapes of the front and reverse sides of the light emission panel 4, whereby it is possible to reduce uneven emission of light from the plurality of light emission sources (the plurality of high-luminance LEDs 23), and emit light at a desired emission angle.

As shown in FIG. 9, although the main capacitor 29 is accommodated within the bounce housing 8, differently from the case where the xenon tube is used, the main capacitor 29 is not charged at high voltage. The main capacitor 29 instantaneously causes high current to flow through the high-luminance LEDs 23 of the LED light unit 53 to thereby cause the high-luminance LEDs 23 to emit flash light as emitted from the xenon tube. In this case, the emission of flash light is instantaneous, and hence it is possible to cause lighting (light emission) of the high-luminance LEDs 23 at a luminance higher than when continuous lighting is executed, without damaging the high-luminance LEDs 23. Note that the high-luminance LEDs 23 of the LED light unit 53 can also be used for continuous lighting with a predetermined amount of light.

A plurality of heat dissipating fins 52a are integrally formed on a surface of the LED base 52, opposite to the surface on which the high-luminance LED is mounted, whereby the LED base 52 itself functions as a heat dissipating member. The heat dissipating fins 52a are arranged, as shown in FIG. 9, such that they face a gap 38 between the light emission unit housing 5 and the bounce housing 8, which is a heat dissipating path. Therefore, heat generated by the high-luminance LEDs 23 of the LED light unit 53 is dissipated in the air in the gap 38, and the warmed air flows in a direction indicated by an arrow C, and then is discharged outside from the gap 31 at the top of the bounce housing 8, similarly to the first embodiment. At this time, similarly to the first embodiment, the chimney effect causes outside air to flow in a direction indicated by an arrow D from the outer periphery of the boundary between the bounce housing 8 and the control unit housing 3, and hence the members defining the passage through which the warmed air flows are prevented from being excessively heated.

As described above, according to the second embodiment, also in the strobe device using the LED light unit 53 including the plurality of high-luminance LEDs 23 as the main light source, it is possible to safely discharge heat generated by the high-luminance LEDs 23 to the external space by the heat dissipating structure which is not directly exposed to the appearance.

According to the present invention, if the strobe device has the bounce function, and is divided into a plurality of housings, even when the LED light unit using the high-luminance LED having a fear of generation of heat due to continuous lighting is assembled to any one of the housings, it is possible to realize the heat dissipating structure in which the heat dissipating member is arranged in a manner facing the boundary between the respective housings, and is not directly exposed to the appearance. This prevents the quality of appearance of the strobe device from being degraded, and further, the heat dissipating member is prevented from being directly touched by a user's hand, and hence it is possible to prevent the user from suffering from burn injury or the like accident.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions. Further, the embodiments of the present invention are described only by way of example, and it is possible to combine the embodiments on an as needed basis.

For example, although in the first embodiment, the head plate 19 as the heat dissipating member is unitized together with the head part 2, the head plate 19 may be attached to the front cover 9 together with the LED light unit 10 in advance. Further, the head plate 19 is only required to function at least as the heat dissipating member, and is not necessarily required to have the click function and the rotation restriction function. Therefore, the LED board 22 itself, which has the high-luminance LED 23 mounted thereon, may be changed in shape to thereby cause the same to serve as the heat dissipating member. Further, although in the second embodiment, similarly to the first embodiment, the heat dissipating fins 52a are formed integrally with the LED base 52, the high-luminance LEDs 23 may be mounted on an LED board made of a flat metal plate and a heat dissipating member having heat dissipating fins may be brought into close contact with the LED board.

Although in the above-described embodiment, the description has been given of the strobe device divided into three separate housings such that bounce operation can be performed in the vertical direction and in the horizontal direction, the present invention is not limited to this. For example, the present invention can be applied to a strobe device divided into two housings such that bounce operation can be performed only in the vertical direction, and the second embodiment in which the LED light unit 53 is provided within the light emission unit housing 5, with the same arrangement as described above, can be applied thereto. Further, even in a case where the LED light unit is provided within the control unit housing (the bounce housing 8 is integrated in a case where the strobe device has the function of performing bouncing operation only in the vertical direction), the heat dissipating member may be disposed in a manner facing the boundary with the light emission unit housing by contriving the shape of the heat dissipating member.

This application claims the benefit of Japanese Patent Application No. 2013-157563 filed Jul. 30, 2013, which is hereby incorporated by reference herein in its entirety.

What is claimed is:

1. A lighting device comprising:
   a light emission unit;
   a heat dissipating member to which heat generated by said light emission unit is transferred;
   a first housing that contains said light emission unit and said heat dissipating member;
   a first cover that is used for at least part of an exterior of said first housing, said first cover having at least one first opening formed therein; and
   a second housing that can turn with respect to said first housing, said second housing containing a second light emission unit,
   wherein the at least one first opening is formed in a surface, opposed to said second housing, of said first cover.

2. The lighting device according to claim 1, wherein said heat dissipating member faces at least part of the at least one first opening.

3. The lighting device according to claim 1, wherein when a turned state of said second housing with respect to said first housing is a first state, air having heat transmitted thereto from said heat dissipating member is discharged outside the lighting device through a path formed by said second housing.

4. The lighting device according to claim 3, wherein when the turned state of said second housing with respect to said first housing is the first state, said heat dissipating member is not exposed to an outside of the lighting device.

5. The lighting device according to claim 3, wherein when the turned state of said second housing with respect to said first housing is a second state different from the first state, the at least one first opening faces none of at least one second opening.

6. The lighting device according to claim 1, wherein a light source of said light emission unit is an LED.

7. The lighting device according to claim 1, wherein a light source of the second light emission unit is a xenon tube.

8. The lighting device according to claim 1, wherein said heat dissipating member is fixed to a substrate of said light emission unit with screws.

9. A lighting device comprising:
   a light emission unit;
   a heat dissipating member to which heat generated by said light emission unit is transferred;
   a first housing that contains said light emission unit and said heat dissipating member;
   a first cover that is used for at least part of an exterior of said first housing, said first cover having at least one first opening formed therein; and
   a second housing that can turn with respect to said first housing,
   wherein said first housing contains a mounting portion for mounting the lighting device to another device.

10. The lighting device according to claim 9, wherein the mounting portion is a portion for mounting the lighting device to an image pickup apparatus.

11. A lighting device comprising:
    a light emission unit;
    a heat dissipating member to which heat generated by said light emission unit is transferred;
    a first housing that contains said light emission unit and said heat dissipating member;
    a first cover that is used for at least part of an exterior of said first housing, said first cover having at least one first opening formed therein; and
    a second housing that can turn with respect to said first housing,
    wherein said heat dissipating member has engaging portions formed thereon for stoppingly engaging said second housing with respect to said first housing.

12. A lighting device comprising:
    a light emission unit;
    a heat dissipating member to which heat generated by said light emission unit is transferred;
    a first housing that contains said light emission unit and said heat dissipating member;
    a first cover that is used for at least part of an exterior of said first housing, said first cover having at least one first opening formed therein; and
    a second housing that can turn with respect to said first housing,
    wherein said heat dissipating member has a restriction portion formed therein for restricting turning of said second housing with respect to said first housing.

* * * * *